United States Patent
Hirai

(10) Patent No.: US 12,347,621 B2
(45) Date of Patent: Jul. 1, 2025

(54) MULTILAYER CERAMIC CAPACITOR INCLUDING MAIN-SURFACE-SIDE OUTER LAYER PORTIONS INCLUDING PROTECTIVE STRUCTURES

(71) Applicant: Murata Manufacturing Co., Ltd., Nagaokakyo (JP)

(72) Inventor: Kenta Hirai, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 171 days.

(21) Appl. No.: 18/111,992

(22) Filed: Feb. 21, 2023

(65) Prior Publication Data

US 2023/0268119 A1    Aug. 24, 2023

(30) Foreign Application Priority Data

Feb. 24, 2022    (JP) .................... 2022-026304

(51) Int. Cl.
  *H01G 4/224*    (2006.01)
  *H01G 4/005*    (2006.01)
  *H01G 4/30*    (2006.01)

(52) U.S. Cl.
  CPC ............ *H01G 4/224* (2013.01); *H01G 4/005* (2013.01); *H01G 4/30* (2013.01)

(58) Field of Classification Search
  CPC ........... H01G 4/30; H01G 4/005; H01G 4/224
  See application file for complete search history.

(56) References Cited

U.S. PATENT DOCUMENTS

| | | | |
|---|---|---|---|
| 2015/0055273 A1 | 2/2015 | Endo et al. | |
| 2017/0062130 A1* | 3/2017 | Oh | H01G 4/0085 |
| 2019/0172643 A1* | 6/2019 | Cha | H01G 4/012 |
| 2020/0066450 A1* | 2/2020 | Uenishi | H01G 4/012 |
| 2021/0005390 A1* | 1/2021 | Lee | H01G 4/12 |
| 2021/0020373 A1* | 1/2021 | Kim | H01G 4/1218 |
| 2021/0090808 A1* | 3/2021 | Jeong | H01G 4/30 |
| 2022/0139627 A1* | 5/2022 | Kim | H01G 4/30 361/301.4 |
| 2023/0207193 A1* | 6/2023 | Chung | H01G 4/232 361/301.4 |

FOREIGN PATENT DOCUMENTS

| | | | |
|---|---|---|---|
| JP | 2000269074 A | * | 9/2000 |
| JP | 2013093374 A | * | 5/2013 |
| JP | 2015-062216 A | | 4/2015 |
| JP | 2019106443 A | * | 6/2019 |
| KR | 20050064802 A | * | 6/2005 |

* cited by examiner

*Primary Examiner* — David M Sinclair
(74) *Attorney, Agent, or Firm* — Keating & Bennett, LLP

(57) ABSTRACT

A multilayer ceramic capacitor includes a multilayer body including dielectric layers, first and second internal electrode layers on the dielectric layers and respectively exposed at first and second end surfaces, and first and second external electrodes respectively located on first and second end surfaces of the multilayer body. The multilayer body includes an inner layer portion, and first and second main-surface-side outer layer portions each including a protective structure made of metal and not overlapping the inner layer portion when the multilayer ceramic capacitor is seen from above. The protective structure is not in contact with first and second end surfaces.

19 Claims, 6 Drawing Sheets

CROSS-SECTIONAL VIEW TAKEN ALONG LINE II-II

CROSS-SECTIONAL VIEW TAKEN ALONG LINE III-III

CROSS-SECTIONAL VIEW TAKEN ALONG LINE IV-IV

CROSS-SECTIONAL VIEW TAKEN ALONG LINE VA-VA

CROSS-SECTIONAL VIEW TAKEN ALONG LINE VB-VB

CROSS-SECTIONAL VIEW TAKEN ALONG LINE VIB-VIB

MULTILAYER CERAMIC CAPACITOR INCLUDING MAIN-SURFACE-SIDE OUTER LAYER PORTIONS INCLUDING PROTECTIVE STRUCTURES

CROSS REFERENCE TO RELATED APPLICATIONS

This application claims the benefit of priority to Japanese Patent Application No. 2022-026304 filed on Feb. 24, 2022. The entire contents of this application are hereby incorporated herein by reference.

BACKGROUND OF THE INVENTION

1. Field of the Invention

The present invention relates to a multilayer ceramic capacitor.

2. Description of the Related Art

In recent years, along with downsizing and thinning of electronic devices, downsizing and height reduction of electronic components mounted on those electronic devices have been advanced. Many multilayer ceramic capacitors having a product shape of 0.6 mm×0.3 mm×0.3 mm are used for mobile phones, particularly smartphones, and recently, components having a product shape of 0.4 mm×0.2 mm×0.2 mm are also used. A mobile device such as a mobile phone or a smartphone is highly likely to be subjected to an impact caused by dropping during use, and thus high mechanical strength is required.

To improve the mechanical strength, a multilayer ceramic electronic component described in Japanese Patent Laid-Open No. 2015-62216 has been proposed, for example.

The multilayer ceramic electronic component described in Japanese Patent Laid-Open No. 2015-62216 is configured as a multilayer body including an inner layer portion in which dielectric layers including $ABO_3$ as a main component (where A includes at least Ba, and B represents a perovskite crystal including at least Ti) and internal electrode layers are alternately laminated, and a pair of outer layer portions that sandwich the inner layer portion, wherein each of the outer layer portion is provided with a continuous film including a Ba—Si—Ti—O-based crystal phase.

As in the above configuration, by providing a continuous film of the Ba—Si—Ti—O-based crystal phase as the continuous film of the outer layer portion, the mechanical strength can be increased.

However, Japanese Patent Laid-Open No. 2015-62216 has a problem that by changing the ceramic composition of the inner layer portion and the outer layer portion as in Japanese Patent Laid-Open No. 2015-62216, an adhesion force of an interface between the inner layer portion and the outer layer portion is reduced, and as a result, delamination occurs, and the inner layer portion and the outer layer portion are delaminated at the interface.

SUMMARY OF THE INVENTION

Preferred embodiments of the present invention provide multilayer ceramic capacitors that are each able to achieve improved mechanical strength and reduce or prevent delamination.

A multilayer ceramic capacitor according to a preferred embodiment of the present invention includes a multilayer body including a plurality of dielectric layers that are laminated, and including a first main surface and a second main surface facing each other in a height direction, a first side surface and a second side surface facing each other in a width direction orthogonal or substantially orthogonal to the height direction, and a first end surface and a second end surface facing each other in a length direction orthogonal or substantially orthogonal to the height direction and the width direction, a first internal electrode layer on the plurality of dielectric layers and exposed to the first end surface, a second internal electrode layer on the plurality of dielectric layers and exposed to the second end surface, a first external electrode on the first end surface, and a second external electrode on the second end surface, wherein the multilayer body includes an inner layer portion in which the plurality of internal electrode layers face each other, a first main-surface-side outer layer portion on a side of the first main surface and including the plurality of dielectric layers between the first main surface and an outermost surface of the inner layer portion on the side of the first main surface and an extension plane of the outermost surface, and a second main-surface-side outer layer portion on a side of the second main surface and including a plurality of dielectric layers between the second main surface, and an outermost surface of the inner layer portion on the side of the second main surface and an extension plane of the outermost surface, the first main-surface-side outer layer portion and the second main-surface-side outer layer portion each include a protective structure made of metal and located at a position not overlapping the inner layer portion when the multilayer ceramic capacitor is seen from above, and the protective structure is not in contact with the first end surface and the second end surface.

In a multilayer ceramic capacitor according to a preferred embodiment of the present invention, the first main-surface-side outer layer portion and the second main-surface-side outer layer portion each include the protective structure made of metal at the position not overlapping the inner layer portion when the multilayer ceramic capacitor is seen from above. Therefore, the protective structure enables improved mechanical strength, as compared to a case where the first main-surface-side outer layer portion and the second main-surface-side outer layer portion, which are not in contact with the first end surface and the second end surface and have lower mechanical strength, are defined only by the dielectric layers.

In addition, in a multilayer ceramic capacitor according to a preferred embodiment of the present invention, the protective structure is not in contact with the first end surface and the second end surface, and therefore the occurrence of delamination between the inner layer portion and the first main-surface-side outer layer portion and between the inner layer portion and the second main-surface-side outer layer portion is able to be reduced or prevented.

According to preferred embodiments of the present invention, it is possible to provide multilayer ceramic capacitors that are each able to achieve improved mechanical strength and reduce or prevent delamination.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

A multilayer ceramic capacitor according to a preferred embodiment of the present invention will be described.

Figure 1:
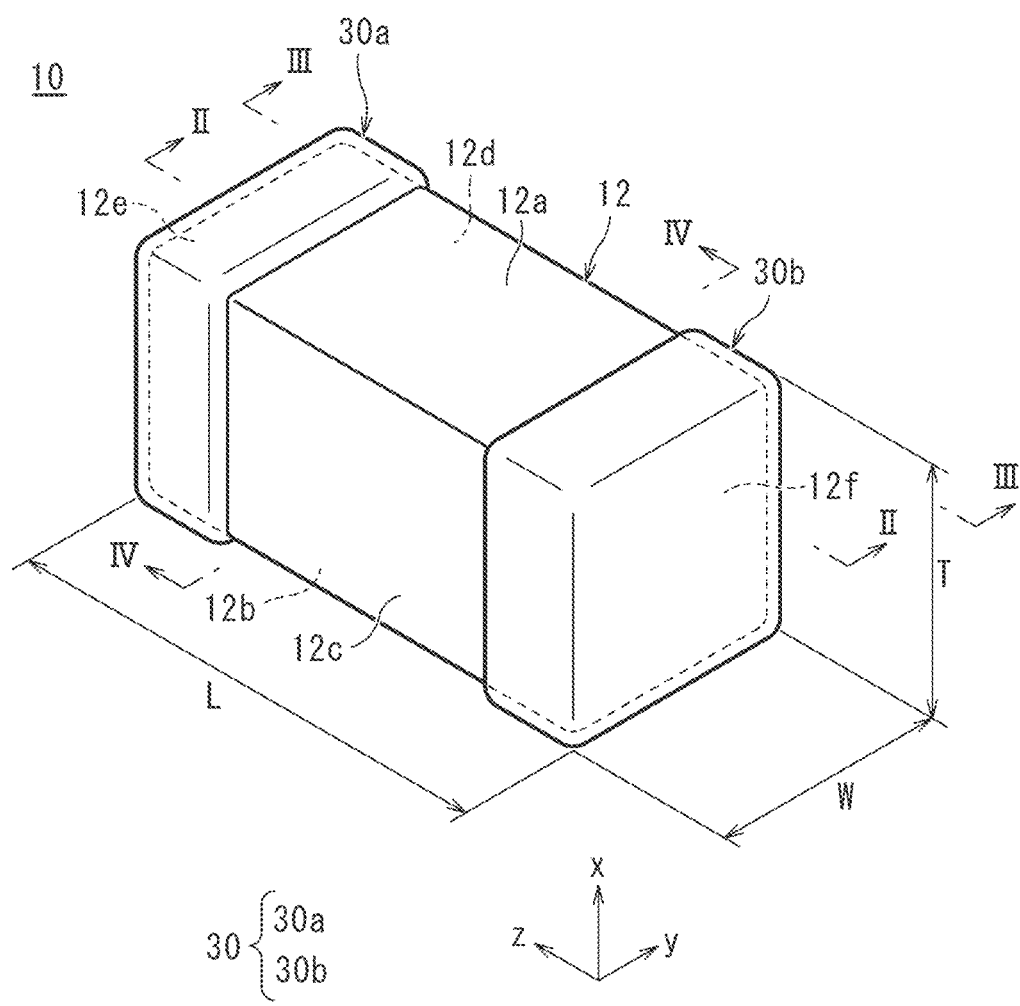
FIG. 1 is an external perspective view showing an example of a multilayer ceramic capacitor according to a preferred embodiment of the present invention.
Figure 2:
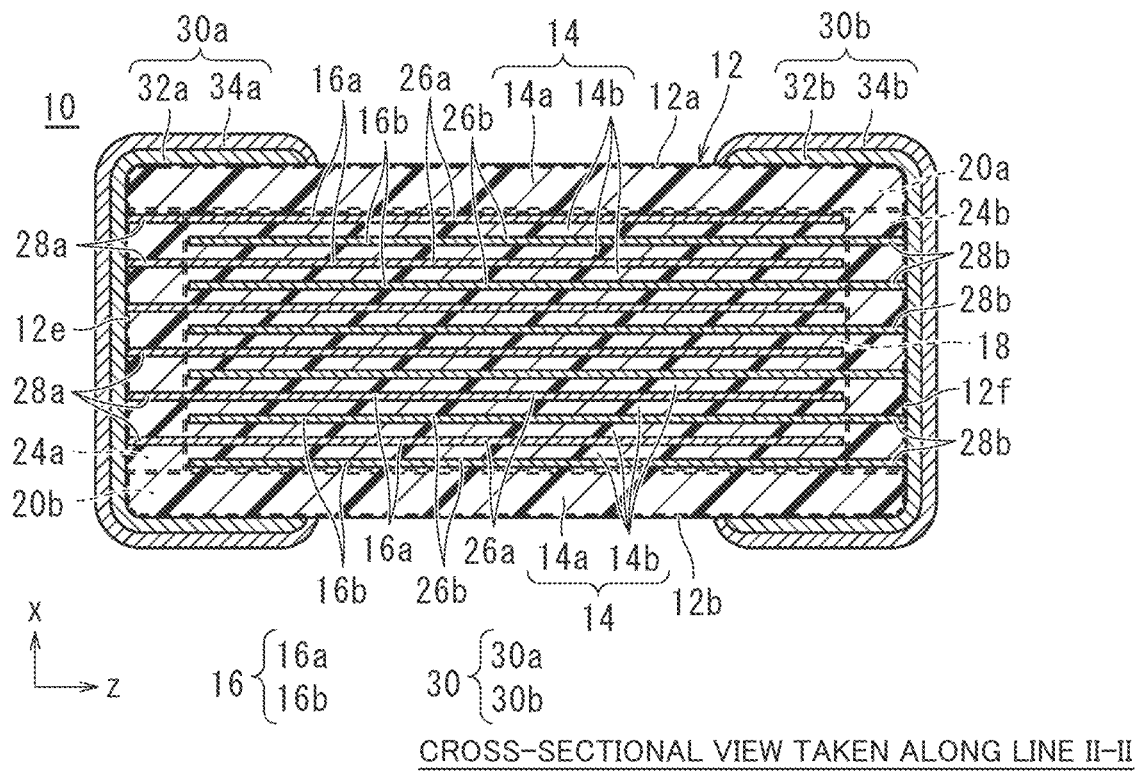
FIG. 2 is a cross-sectional view taken along line II-II in FIG. 1.
Figure 3:
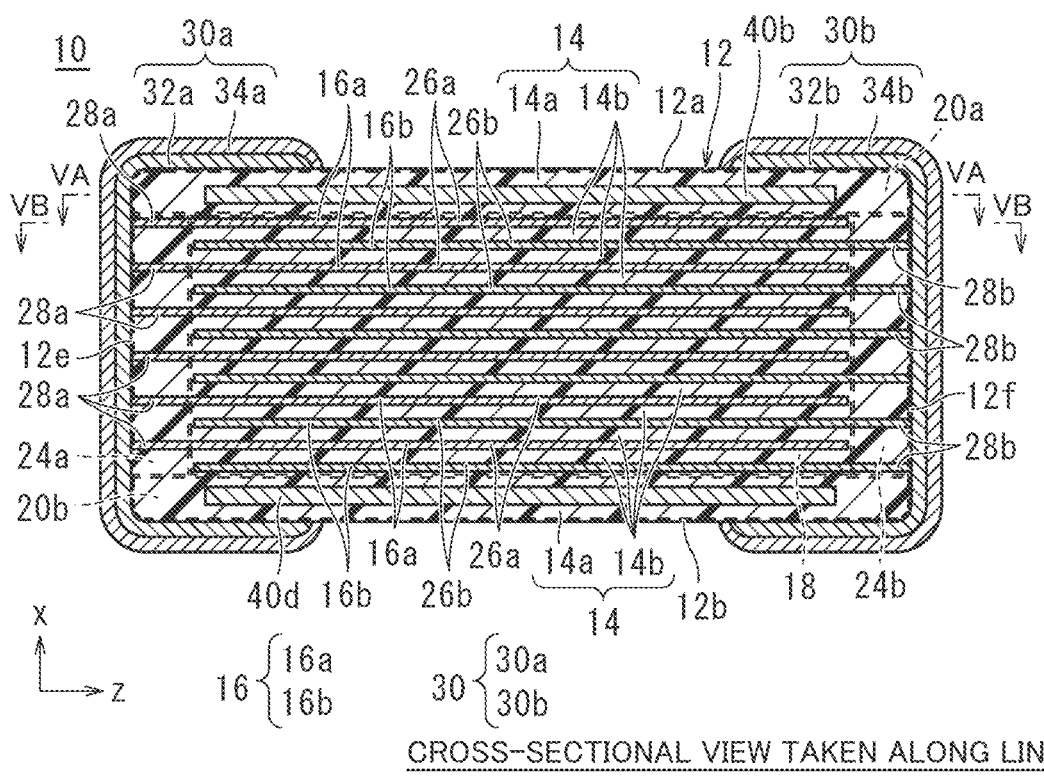
FIG. 3 is a cross-sectional view taken along line III-III in FIG. 1.
Figure 4:
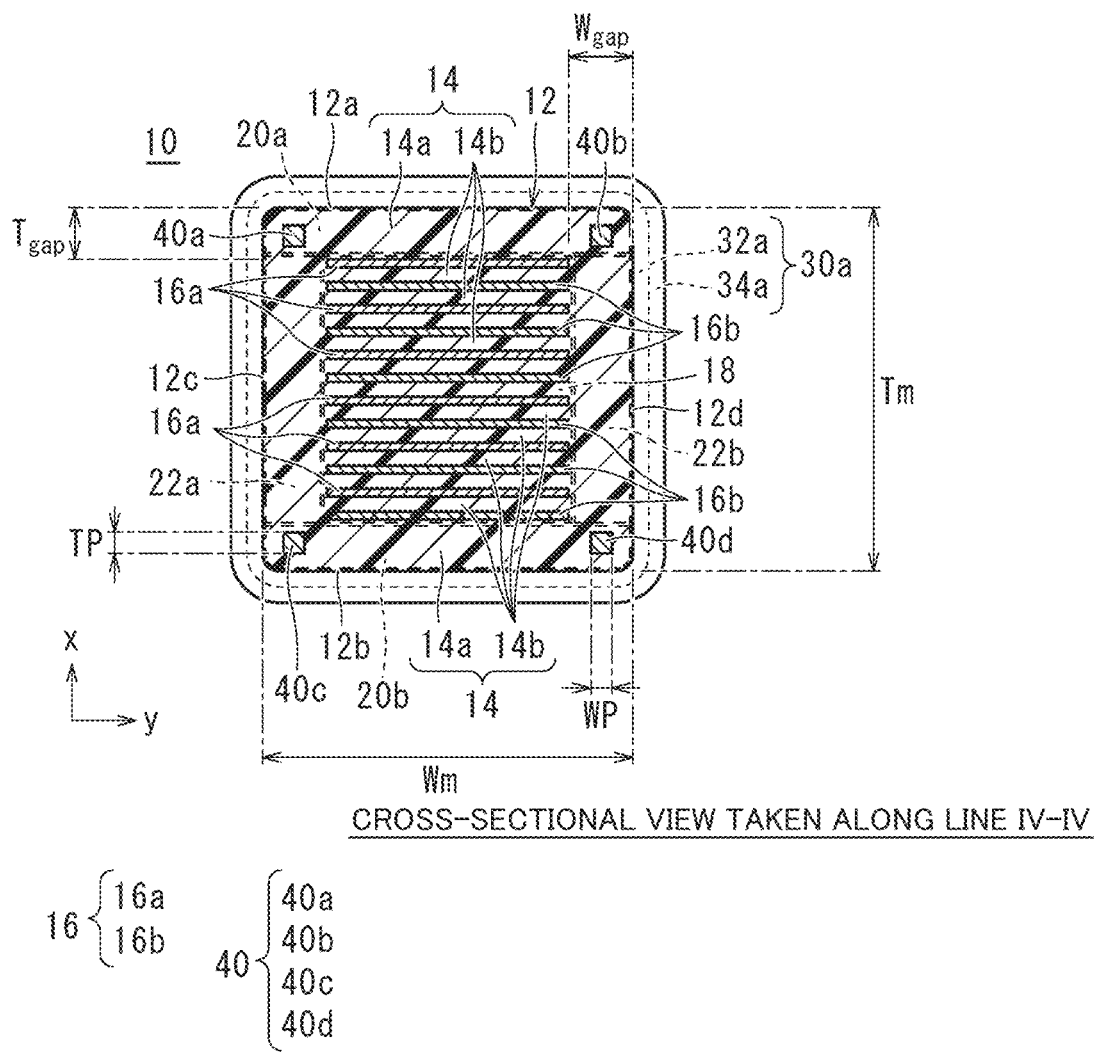
FIG. 4 is a cross-sectional view taken along line IV-IV in FIG. 1.
Figure 5A:
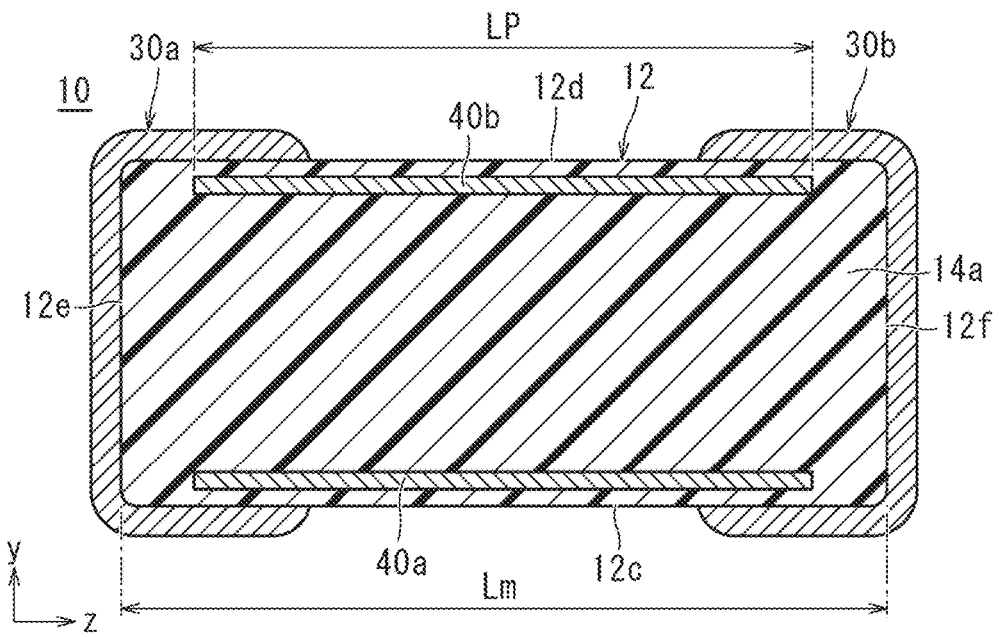
FIG. 5A is a cross-sectional view taken along line VA-VA in FIG. 3.
Figure 5B:
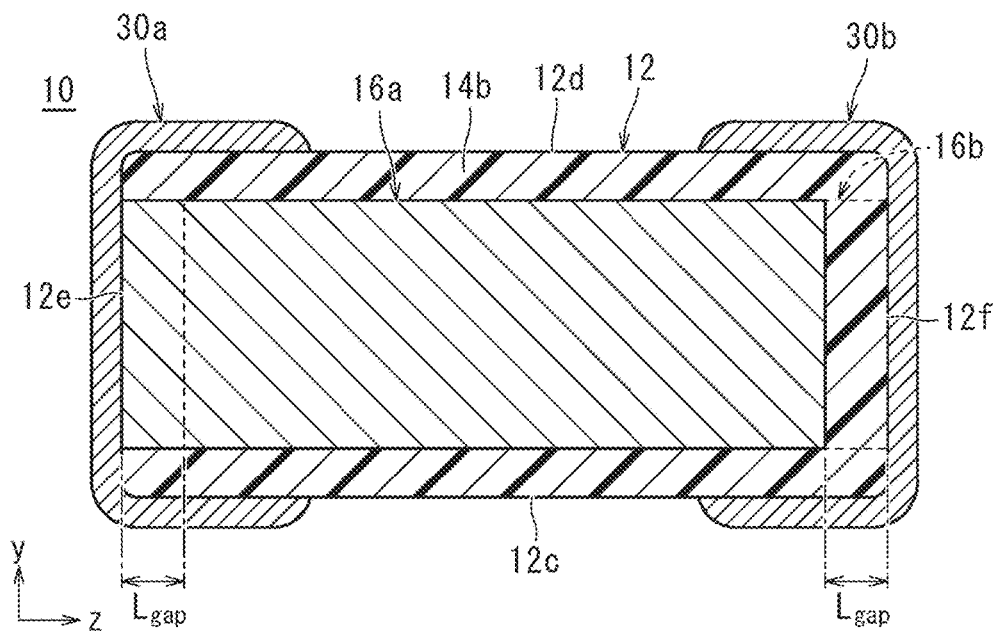
FIG. 5B is a cross-sectional view taken along line VB-VB in FIG. 3.
Figure 6A:
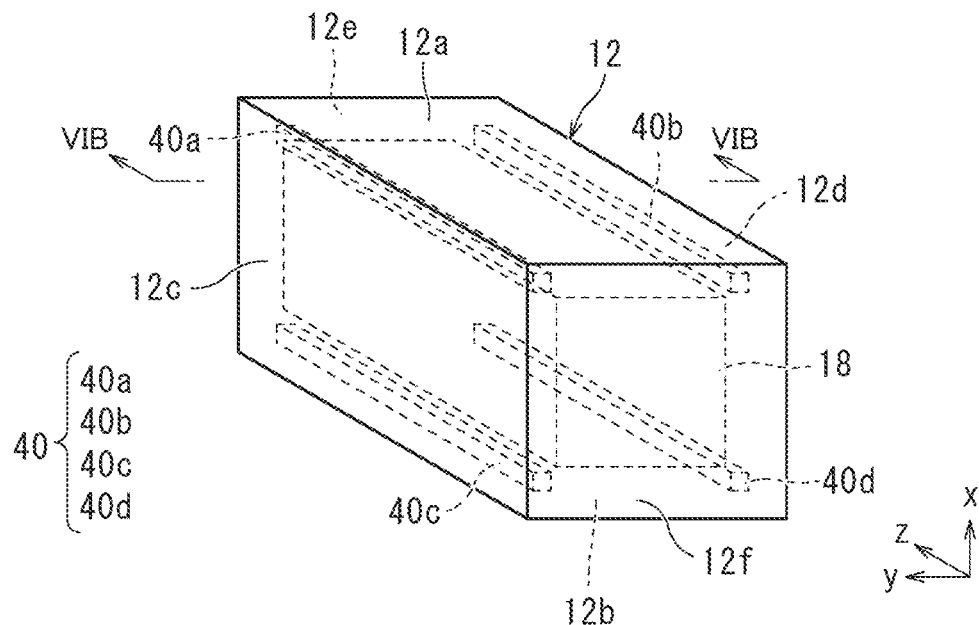
FIG. 6A is an external perspective view corresponding to FIG. 1, showing a multilayer body of a multilayer ceramic capacitor according to a preferred embodiment of the present invention.
Figure 6B:
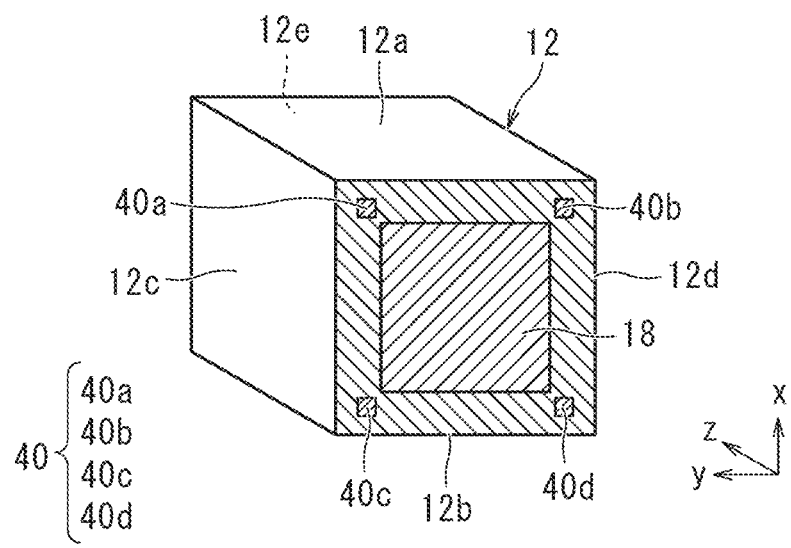
FIG. 6B is a cross-sectional view of the multilayer ceramic capacitor according to the present preferred embodiment of the present invention taken along line VIB-VIB in FIG. 6A.

FIG. 1 is an external perspective view showing an example of a multilayer ceramic capacitor according to a preferred embodiment of the present invention. FIG. 2 is a cross-sectional view taken along line II-II in FIG. 1. FIG. 3 is a cross-sectional view taken along line III-III in FIG. 1. FIG. 4 is a cross-sectional view taken along line IV-IV in FIG. 1. FIG. 5A is a cross-sectional view taken along line VA-VA in FIG. 3, and FIG. 5B is a cross-sectional view taken along line VB-VB in FIG. 3. FIG. 6A is an external perspective view corresponding to FIG. 1, showing a multilayer body of a multilayer ceramic capacitor according to a preferred embodiment of the present invention, and FIG. 6B is a cross-sectional view taken along line VIB-VIB in FIG. 6A.

As shown in FIG. 1, a multilayer ceramic capacitor 10 includes a rectangular or substantially rectangular parallelepiped multilayer body 12. The "rectangular parallelepiped" described above includes a rectangular or substantially rectangular parallelepiped including rounded corner portions and ridge portions. That is, a "rectangular parallelepiped" member generally means a member including first and second main surfaces 12a and 12b, first and second side surfaces 12c and 12d, and first and second end surfaces 12e and 12f.

Multilayer body 12 includes a plurality of dielectric layers 14 and a plurality of internal electrode layers 16 that are laminated. Furthermore, multilayer body 12 includes first main surface 12a and second main surface 12b facing each other in a height direction x, first side surface 12c and second side surface 12d facing each other in a width direction y orthogonal or substantially orthogonal to height direction x, and first end surface 12e and second end surface 12f facing each other in a length direction z orthogonal or substantially orthogonal to height direction x and width direction y. Multilayer body 12 includes a corner portion and a ridge portion that are rounded. The corner portion is a portion where three adjacent surfaces of the multilayer body are joining, and the ridge portion is a portion where two adjacent surfaces of the multilayer body are joining. In addition, irregularities or the like may be provided on a portion or all of first main surface 12a and second main surface 12b, first side surface 12c and second side surface 12d, and first end surface 12e and second end surface 12f.

Dielectric layer 14 can be made of, for example, a dielectric material as a ceramic material. As such a dielectric material, for example, a dielectric ceramic including a component such as $BaTiO_3$, $CaTiO_3$, $SrTiO_3$, or $CaZrO_3$ can be used. When the above dielectric material is included as a main component, depending on desired characteristics of multilayer body 12, for example, it is possible to use a material to which an accessory component, such as a Mn compound, an Fe compound, a Cr compound, a Co compound, or a Ni compound, of a content smaller than that of the main component is added.

A thickness of dielectric layer 14 after firing is preferably, for example, greater than or equal to about 0.5 μm and less than or equal to about 10.0 μm.

Multilayer body 12 includes an inner layer portion 18 including one or more dielectric layers 14b and the plurality of internal electrode layers 16 disposed thereon. In inner layer portion 18, the plurality of internal electrode layers 16 face each other.

Multilayer body 12 includes a first main-surface-side outer layer portion 20a that is located on a side of first main surface 12a, and that includes more than one dielectric layer 14a located between first main surface 12a, an outermost surface of inner layer portion 18 on the side of first main surface 12a, and a straight line of the outermost surface.

Similarly, multilayer body 12 includes a second main-surface-side outer layer portion 20b that is located on a side of second main surface 12b, and that includes more than one dielectric layer 14a located between second main surface 12b, the outermost surface of inner layer portion 18 on the side of second main surface 12b, and a straight line of the outermost surface.

Multilayer body 12 includes a first side-surface-side outer layer portion 22a that is located on a side of first side surface 12c, and that includes more than one dielectric layer 14b located between first side surface 12c and the outermost surface of inner layer portion 18 on the side of first side surface 12c.

Similarly, multilayer body 12 includes a second side-surface-side outer layer portion 22b that is located on a side of second side surface 12d, and that includes more than one dielectric layer 14b located between second side surface 12d and the outermost surface of inner layer portion 18 on the side of second side surface 12d.

Multilayer body 12 includes a first end-surface-side outer layer portion 24a that is located on a side of first end surface 12e, and that includes more than one dielectric layer 14b located between first end surface 12e and the outermost surface of inner layer portion 18 on the side of first end surface 12e.

Similarly, multilayer body 12 includes a second end-surface-side outer layer portion 24b that is located on a side of second end surface 12f, and that includes more than one dielectric layer 14b located between second end surface 12f and the outermost surface of inner layer portion 18 on the side of second end surface 12f.

It is preferable that a main component of a ceramic material of dielectric layer 14a defining first main-surface-side outer layer portion 20a and second main-surface-side outer layer portion 20b is the same or substantially the same as a main component of a ceramic material of dielectric layer 14b defining inner layer portion 18.

With the above configuration, it is possible to improve an adhesion force at an interface between first main-surface-side outer layer portion 20a and inner layer portion 18 and at an interface between second main-surface-side outer layer portion 20b and inner layer portion 18. In other words, according to the above configuration, it is possible to reduce or prevent delamination between first main-surface-side outer layer portion 20a and inner layer portion 18, as well as between second main-surface-side outer layer portion 20b and inner layer portion 18 without decreasing the adhesion force at the interface between first main-surface-side outer layer portion 20a and inner layer portion 18 and the interface between second main-surface-side outer layer portion 20b and inner layer portion 18, and thus delamination can be reduced or prevented.

Dimensions of multilayer body 12 are not particularly limited, but, for example, a dimension Lm in length direction z is preferably greater than or equal to about 1.5 mm and less than or equal to about 3.0 mm, a dimension Wm in width direction y is preferably greater than or equal to about 0.8 mm and less than or equal to about 2.4 mm, and a dimension Tm in height direction x is preferably greater than or equal to about 0.8 mm and less than or equal to about 2.4 mm.

On each of first main-surface-side outer layer portion 20a and second main-surface-side outer layer portion 20b, a protective structure 40 made of metal is disposed at a position not overlapping inner layer portion 18 when multilayer ceramic capacitor 10 is seen through from above.

Specifically, when seen from an upper surface of multilayer ceramic capacitor 10, protective structure 40 includes a protective structure 40a extending in length direction z on the side of first side surface 12c not overlapping inner layer portion 18 in first main-surface-side outer layer portion 20a, and a protective structure 40b extending in length direction z on the side of second side surface 12d not overlapping inner layer portion 18 in first main-surface-side outer layer portion 20a.

In addition, when seen from the upper surface of multilayer ceramic capacitor 10, protective structure 40 includes a protective structure 40c extending in length direction z on the side of first side surface 12c not overlapping inner layer portion 18 in second main-surface-side outer layer portion 20b, and a protective structure 40d extending in length direction z on the side of second side surface 12d not overlapping inner layer portion 18 in second main-surface-side outer layer portion 20b.

Protective structure 40 preferably extends continuously along length direction z. Specifically, a shape of protective structure 40 may be linear or curved.

Protective structure 40 is not in contact with first end surface 12e and second end surface 12f. In other words, protective structure 40 is not exposed to first end surface 12e and second end surface 12f, and is disposed inside first main-surface-side outer layer portion 20a and second main-surface-side outer layer portion 20b.

With the above configuration, it is possible to reduce or prevent the occurrence of delamination between inner layer portion 18 and first main-surface-side outer layer portion 20a and between inner layer portion 18 and second main-surface-side outer layer portion 20b.

In addition, with the above configuration, it is possible to reduce or prevent the generation of a leakage current from both end surfaces 12e and 12f via protective structure 40.

A length LP of protective structure 40 in length direction z is preferably, for example, greater than or equal to about 76% and less than or equal to about 91% of dimension Lm of multilayer body 12 in length direction z.

With the above configuration, mechanical strength of first main-surface-side outer layer portion 20a and second main-surface-side outer layer portion 20b can be further improved. When length LP of protective structure 40 in length direction z is less than about 76% with respect to dimension Lm of multilayer body 12 in length direction z, an amount of protective structure 40 to maintain the mechanical strength is insufficient, and therefore the mechanical strength of first main-surface-side outer layer portion 20a and second main-surface-side outer layer portion 20b decreases. On the other hand, when length LP of protective structure 40 in length direction z exceeds about 91% with respect to dimension Lm of multilayer body 12 in length direction z, delamination easily occurs between inner layer portion 18 and first main-surface-side outer layer portion 20a, and between inner layer portion 18 and second main-surface-side outer layer portion 20b.

A length WP of protective structure 40 in width direction y is preferably, for example, greater than or equal to about 49% and less than or equal to about 90% of a dimension Wgap of first side-surface-side outer layer portion 22a and second side-surface-side outer layer portion 22b in width direction y.

With the above configuration, mechanical strength of first main-surface-side outer layer portion 20a and second main-surface-side outer layer portion 20b can be further improved. When length WP of protective structure 40 in width direction y is less than about 49% of dimension Wgap of first side-surface-side outer layer portion 22a and second side-surface-side outer layer portion 22b in width direction y, the amount of protective structure 40 to maintain the mechanical strength is insufficient, and therefore the mechanical strength of first main-surface-side outer layer portion 20a and second main-surface-side outer layer portion 20b decreases. On the other hand, when length WP of protective structure 40 in width direction y exceeds about 90% of dimension Wgap of first side-surface-side outer layer portion 22a and second side-surface-side outer layer portion 22b in width direction y, delamination easily occurs between inner layer portion 18 and first main-surface-side outer layer portion 20a, and between inner layer portion 18 and second main-surface-side outer layer portion 20b.

A length TP of protective structure 40 in height direction x is preferably, for example, greater than or equal to about 60% and less than or equal to about 95% of a dimension Tgap of first main-surface-side outer layer portion 20a and second main-surface-side outer layer portion 20b in height direction x.

With the above configuration, mechanical strength of first main-surface-side outer layer portion 20a and second main-surface-side outer layer portion 20b can be further improved. When length TP of protective structure 40 in height direction x is less than about 60% of dimension Tgap of first mainsurface-side outer layer portion 20a and second main-surface-side outer layer portion 20b in height direction x, the amount of protective structure 40 to maintain the mechanical strength is insufficient, and therefore the mechanical strength of first main-surface-side outer layer portion 20a and second main-surface-side outer layer portion 20b decreases. On the other hand, when length TP of protective structure 40 in height direction x exceeds about 95% with respect to dimension Tgap of first main-surface-side outer layer portion 20a and second main-surface-side outer layer portion 20b in height direction x, delamination easily occurs between inner layer portion 18 and first main-surface-side outer layer portion 20a and between inner layer portion 18 and second main-surface-side outer layer portion 20b.

It is preferable that the Young's modulus of protective structure 40 is higher than that of dielectric layers 14a present in first main-surface-side outer layer portion 20a and second main-surface-side outer layer portion 20b.

With the above configuration, mechanical strength of first main-surface-side outer layer portion 20a and second main-surface-side outer layer portion 20b can be further improved.

Protective structure 40 is made of metal. The metal of protective structure 40 preferably includes, for example, at least one selected from Ni, Fe, Ti, Cu, Pt, Be, Pd, W, and Mo. Since these metals are materials having a Young's modulus higher than that of the ceramic material of first main-surface-side outer layer portion 20a and second main-surface-side outer layer portion 20b, by using these metals as the material of protective structure 40, deflective strength and mechanical strength of first main-surface-side outer layer portion 20a and second main-surface-side outer layer portion 20b can be further improved.

Protective structure 40 is preferably disposed at a position of, for example, greater than or equal to about 9% and less than or equal to about 24% on an inner side from first end surface 12e and second end surface 12f, with respect to dimension Lm in length direction z of multilayer body 12.

With the above configuration, it is possible to reduce or prevent the generation of a leakage current from both end surfaces 12e and 12f via protective structure 40.

Method for Measuring Dimensions (WP, TP, LP) of Protective Structure

For dimension WP in width direction y and dimension TP in height direction x of protective structure 40, an external electrode 30 is polished with abrasive paper from length direction z of multilayer body 12 to remove all external electrodes 30 existing in length direction z, and then portions of first main-surface-side outer layer portion 20a and second main-surface-side outer layer portion 20b are removed to expose protective structure 40. Next, an entire WT surface from which protective structure 40 is exposed is observed with a microscope at about 50 magnifications and about 100 magnifications, and the length is measured by using image processing software provided for the microscope.

For dimension LP of protective structure 40 in length direction z is obtained by polishing with abrasive paper from width direction y of multilayer body 12 to remove all external electrodes 30 existing in width direction y, and then portions of first main-surface-side outer layer portion 20a and second main-surface-side outer layer portion 20b are removed to expose protective structure 40. Next, an entire LT surface from which the protective structure is exposed is observed with a microscope at about 50 magnifications and about 100 magnifications, and the length is measured by using image processing software provided for the microscope.

Multilayer body 12 includes, as the plurality of internal electrode layers 16, for example, a plurality of first internal electrode layers 16a and a plurality of second internal electrode layers 16b that are rectangular or substantially rectangular. The plurality of first internal electrode layers 16a and the plurality of second internal electrode layers 16b are embedded so as to be alternately arranged at equal or substantially equal intervals with dielectric layer 14 interposed therebetween along height direction x of multilayer body 12. Each of first internal electrode layers 16a and second internal electrode layers 16b is parallel or substantially parallel to first main surface 12a and second main surface 12b. First internal electrode layer 16a and second internal electrode layer 16b face each other with dielectric layer 14 interposed therebetween in height direction x.

First internal electrode layer 16a is disposed on the plurality of dielectric layers 14 and is located inside multilayer body 12. First internal electrode layer 16a includes a first counter electrode portion 26a facing second internal electrode layer 16b, and a first extended electrode portion 28a located on one end side of first internal electrode layer 16a and extending from first counter electrode portion 26a to first end surface 12e of multilayer body 12. An end of first extended electrode portion 28a is extended to the surface of first end surface 12e and exposed from multilayer body 12. Therefore, first internal electrode layer 16a is not exposed on first main surface 12a and second main surface 12b, first side surface 12c and second side surface 12d, and second end surface 12f. In other words, a side of the other end of first internal electrode layer 16a is slightly retracted from second end surface 12f.

Second internal electrode layer 16b is disposed on the plurality of dielectric layers 14 and is located inside multilayer body 12. Second internal electrode layer 16b includes a second counter electrode portion 26b facing first internal electrode layer 16a, and a second extended electrode portion 28b located on one end side of second internal electrode layer 16b and extending from second counter electrode portion 26b to second end surface 12f of multilayer body 12. An end of second extended electrode portion 28b is extended to the surface of second end surface 12f and exposed from multilayer body 12. Therefore, second internal electrode layer 16b is not exposed on first main surface 12a and second main surface 12b, first side surface 12c and second side surface 12d, and first end surface 12e. In other words, a side of the other end of second internal electrode layer 16b is slightly retracted from first end surface 12e.

First internal electrode layer 16a and second internal electrode layer 16b can be made of an appropriate conductive material such as, for example, a metal such as Ni, Cu, Ag, Pd, or Au, or an alloy including at least one of these metals such as an Ag—Pd alloy.

A thickness of each of internal electrode layers 16, that is, each of first internal electrode layers 16a and second internal electrode layers 16b, is preferably, for example, greater than or equal to about 0.2 μm and less than or equal to about 2.0 μm.

As illustrated in FIGS. 1 to 4, external electrode 30 is disposed on the side of first end surface 12e and second end surface 12f of multilayer body 12.

External electrode 30 includes a first external electrode 30a and a second external electrode 30b.

First external electrode 30a is connected to first internal electrode layer 16a and is disposed at least on a surface of first end surface 12e. In addition, first external electrode 30a extends from first end surface 12e of multilayer body 12 to a portion of first main surface 12a and a portion of second main surface 12b, and a portion of first side surface 12c and a portion of second side surface 12d. In this case, first external electrode 30a is electrically connected to first extended electrode portion 28a of first internal electrode layer 16a.

Second external electrode 30b is connected to second internal electrode layer 16b and is disposed at least on a surface of second end surface 12f. Second external electrode 30b extends from second end surface 12f to a portion of first main surface 12a and a portion of second main surface 12b, and a portion of first side surface 12c and a portion of second side surface 12d. In this case, second external electrode 30b is electrically connected to second extended electrode portion 28b of second internal electrode layer 16b.

In multilayer body 12, first counter electrode portion 26a of first internal electrode layer 16a and second counter electrode portion 26b of second internal electrode layer 16b face each other with dielectric layer 14 interposed therebetween, thus generating electrostatic capacitance. Therefore, electrostatic capacitance can be obtained between first external electrode 30a to which first internal electrode layer 16a is connected and second external electrode 30b to which second internal electrode layer 16b is connected, and characteristics of the capacitor are obtained.

Figure 7A:
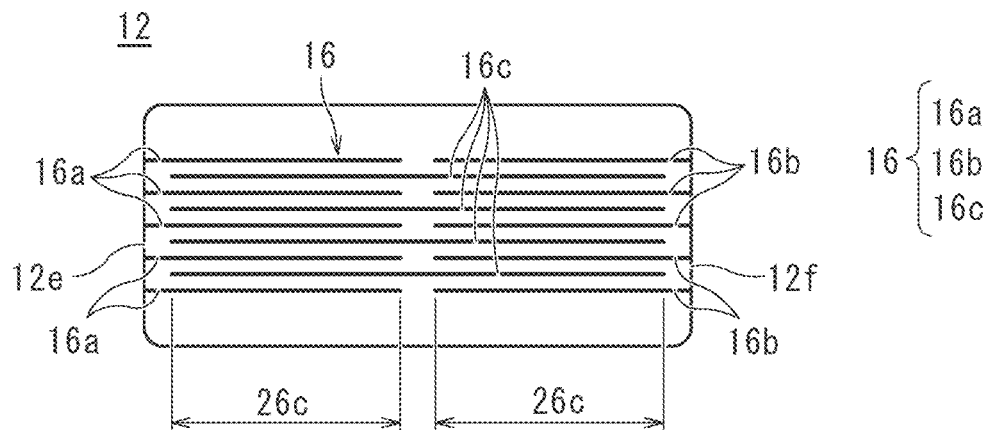
FIG. 7A is a cross-sectional view taken along line II-II of FIG. 1, showing a structure in which a counter electrode portion of an internal electrode layer of a multilayer ceramic capacitor according to a preferred embodiment of the present invention is divided into two parts.
Figure 7B:
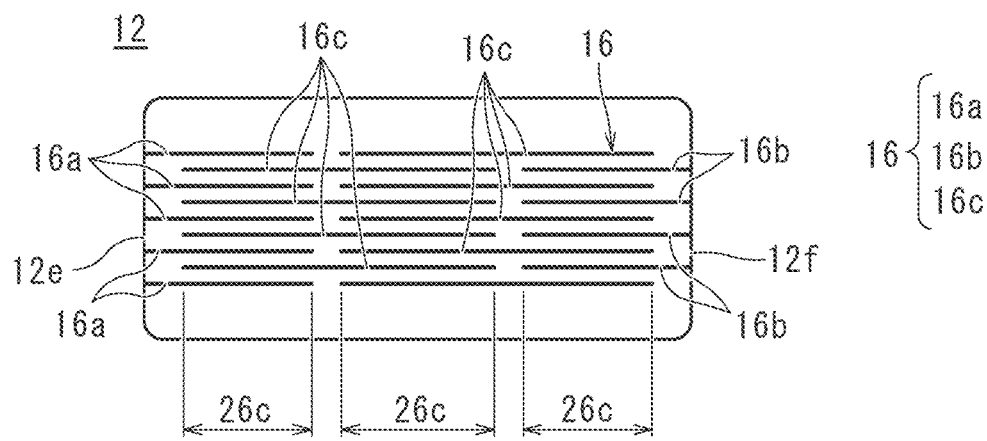
FIG. 7B is a cross-sectional view taken along line II-II of FIG. 1 showing a structure in which a counter electrode portion of an internal electrode layer of a multilayer ceramic capacitor according to a preferred embodiment of the present invention is divided into three parts.
Figure 7C:
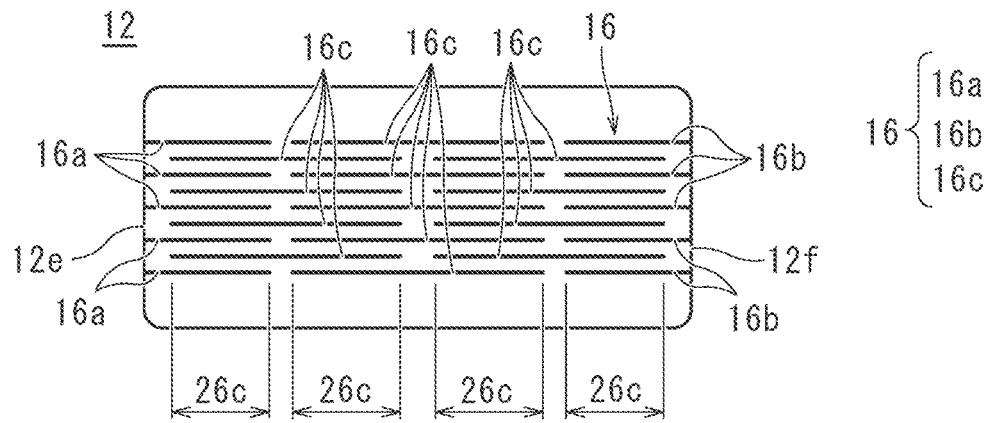
FIG. 7C is a cross-sectional view taken along line II-II of FIG. 1 showing a structure in which a counter electrode portion of an internal electrode layer of a multilayer ceramic capacitor according to a preferred embodiment of the present invention is divided into four parts.

Further, as shown in FIGS. 7A to 7C, multilayer body 12 shown in FIG. 1 may have a structure in which, in addition to first internal electrode layer 16a and second internal electrode layer 16b, a floating internal electrode layer 16c does not extend to either first end surface 12e or second end surface 12f is provided, and counter electrode portion 26c is divided into a plurality of portions by floating internal electrode layer 16c. The structure may be, for example, a double structure as illustrated in FIG. 7A, a triple structure as illustrated in FIG. 7B, and a quadruple structure as illustrated in FIG. 7C, and it should be understood that a fifth or more structure may be provided. In this way, by having a structure in which a counter electrode portion 26c is divided into a plurality of portions, a plurality of capacitor components are provided between opposing internal electrode layers 16a, 16b, and 16c, and these capacitor components are connected in series. Therefore, a voltage applied to each capacitor component decreases, and a withstand voltage of multilayer ceramic capacitor 10 can be increased.

External electrode 30 includes a base electrode layer 32 including a metal component and a glass component, and a plating layer 34 provided on a surface of base electrode layer 32.

It is preferable that first external electrode 30a includes a first base electrode layer 32a disposed on a surface of first end surface 12e, and includes a first plating layer 34a disposed on a surface of first base electrode layer 32a.

It is preferable that second external electrode 30b includes a second base electrode layer 32b disposed on a surface of second end surface 12f, and includes a second plating layer 34b disposed on a surface of second base electrode layer 32b.

Base electrode layer 32 includes a first base electrode layer 32a and a second base electrode layer 32b.

First base electrode layer 32a is disposed on the surface of first end surface 12e of multilayer body 12, and extends from first end surface 12e and covers a portion of each of first main surface 12a, second main surface 12b, first side surface 12c, and second side surface 12d.

Second base electrode layer 32b is disposed on the surface of second end surface 12f of multilayer body 12, and extends from second end surface 12f and covers a portion of each of first main surface 12a, second main surface 12b, first side surface 12c, and second side surface 12d.

First base electrode layer 32a may be disposed only on the surface of first end surface 12e of multilayer body 12, and second base electrode layer 32b may be disposed only on the surface of second end surface 12f of multilayer body 12.

Base electrode layer 32 includes at least one selected from, for example, a baked layer, a conductive resin layer, a thin film layer, and the like.

Hereinafter, configurations in cases where base electrode layer 32 is the baked layer, the conductive resin layer, or the thin film layer will be described.

The baked layer includes a glass component and a metal component. The glass component of the baked layer includes, for example at least one selected from B, Si, Ba, Sr, Ca, Mg, Al, Ti, Zr, K, Na, Li, and the like. The metal component of the baked layer includes at least one selected from Cu, Ni, Ag, Pd, an Ag—Pd alloy, Au, and the like, for example. The baked layer is obtained by applying a conductive paste including the glass component and the metal component to multilayer body 12 and baking the paste. The baked layer may be formed by simultaneously firing a multilayer chip having internal electrode layers 16 and dielectric layers 14 and a conductive paste applied to the multilayer chip, or may be formed by firing a multilayer chip having internal electrode layers 16 and dielectric layers 14 to obtain a multilayer body, and then baking the conductive paste on the multilayer body.

The baked layer may include a plurality of layers.

When base electrode layer 32 includes a ceramic component instead of the glass component, adhesion between multilayer body 12 and base electrode layer 32 can be improved. Base electrode layer 32 may include both a glass component and a ceramic component.

When first base electrode layer 32a is made of the baked layer, a thickness of first base electrode layer 32a located on first end surface 12e at a central portion in height direction x is preferably, for example, about 10 μm or more and about 150 μm or less.

When second base electrode layer 32b is made of the baked layer, a thickness of second base electrode layer 32b located on second end surface 12f at the central portion in height direction x is preferably, for example, about 10 μm or more and about 150 μm or less.

When base electrode layer 32 is provided by a baked layer on first main surface 12a and second main surface 12b, a thickness in the direction connecting first main surface 12a and second main surface 12b at a central part in length direction z of first base electrode layer 32a located on first main surface 12a and second main surface 12b is preferably, for example, about 10 μm or more and about 100 μm or less, and a thickness in the direction connecting first main surface 12a and second main surface 12b at the central part in length direction z of second base electrode layer 32b located on first main surface 12a and second main surface 12b is preferably, for example, about 10 μm or more and about 100 μm or less.

Furthermore, when base electrode layer 32 is provided by a baked layer on first side surface 12c and second side surface 12d, the thickness in the direction connecting first side surface 12c and second side surface 12d at the central portion in length direction z of first base electrode layer 32a located on first side surface 12c and second side surface 12d is preferably, for example, about 10 μm or more and about 100 μm or less, and the thickness in the direction connecting first side surface 12c and second side surface 12d at the central portion in length direction z of second base electrode layer 32b located on first side surface 12c and second side surface 12d is preferably, for example, about 10 μm or more and about 100 μm or less.

When the conductive resin layer is provided as base electrode layer 32, the conductive resin layer may be disposed on the baked layer so as to cover the baked layer, or may be directly disposed on multilayer body 12. However, the conductive resin layer may be disposed only on base electrode layer 32 located on both end surfaces 12e and 12f.

The conductive resin layer includes a metal and a thermosetting resin.

The conductive resin layer may completely cover the base electrode layer, or may cover a portion of the base electrode layer.

Since the conductive resin layer includes a thermosetting resin, the conductive resin layer is more flexible than a conductive layer made of a plated film or a fired product of a conductive paste, for example. Therefore, even when an impact caused by a physical impact or a thermal cycle is applied to multilayer ceramic capacitor 10, the conductive resin layer defines and functions as a buffer layer, and it is possible to prevent cracks in multilayer ceramic capacitor 10 from occurring.

As the metal included in the conductive resin layer, for example, Ag, Cu, or an alloy including these can be used.

In addition, a metal powder in which, for example, a surface of the metal powder is coated with Ag can also be used. When an Ag-coated metal powder is used, it is preferable to use, for example, Cu or Ni as the metal powder. It is also possible to use Cu subjected to an antioxidant treatment. The reason why the conductive metal powder of Ag is used as the conductive metal is that an inexpensive metal can be used as the base material while the above-described characteristics of Ag are maintained.

The metal included in the conductive resin layer is preferably included, for example, in an amount greater than or equal to about 35 vol % and less than or equal to about 75 vol % with respect to the volume of the entire conductive resin.

An average particle diameter of the metal included in the conductive resin layer is not particularly limited. An average particle size of a conductive filler may be, for example, about 0.3 μm or more and about 10 μm or less.

The metal included in the conductive resin layer is mainly responsible for the conductivity of the conductive resin layer. Specifically, when the conductive fillers come into contact with each other, an energization path is provided inside the conductive resin layer.

The metal included in the conductive resin layer may be spherical or flat, but it is preferable to use a mixture of a spherical metal powder and a flat metal powder.

As the resin of the conductive resin layer, for example, various known thermosetting resins such as, for example, an epoxy resin, a phenol resin, a urethane resin, a silicone resin, and a polyimide resin can be used. Among these, an epoxy resin having excellent heat resistance, moisture resistance, adhesion, and the like is preferable.

The conductive resin layer preferably includes a curing agent together with the thermosetting resin. When an epoxy resin is used as the base resin, various known compounds such as, for example, phenol-based, amine-based, acid anhydride-based, imidazole-based, active ester-based, and amide-imide-based compounds can be used as the curing agent of the epoxy resin.

The conductive resin layer may include a plurality of layers.

The thickness of the conductive resin layer located at the central portion in height direction x of multilayer body 12 located at first end surface 12e and second end surface 12f is preferably, for example, about 10 μm or more and about 200 μm or less.

The thin film layer is formed by a thin film forming method such as, for example, sputtering or vapor deposition, and is a layer having, for example, a thickness less than or equal to about 1 μm on which metal particles are deposited.

Plating layer 34 includes first plating layer 34a and a second plating layer 34b.

First plating layer 34a and second plating layer 34b, which are plating layers 34 that can be disposed on base electrode layer 32, will be described with reference to FIG. 2.

First plating layer 34a and second plating layer 34b include, for example, at least one selected from Cu, Ni, Sn, Ag, Pd, an Ag—Pd alloy, Au, and the like.

First plating layer 34a covers first base electrode layer 32a.

Second plating layer 34b covers second base electrode layer 32b.

First plating layer 34a and second plating layer 34b may include a plurality of layers. In this case, plating layer 34 preferably has, for example, a two-layer structure of a lower layer plating layer defined by Ni plating on base electrode layer 32 and an upper layer plating layer defined by Sn plating on the lower layer plating layer.

That is, first plating layer 34a includes a first lower plating layer and a first upper plating layer located on a surface of the first lower plating layer.

Second plating layer 34b includes a second lower plating layer and a second upper plating layer located on a surface of the second lower plating layer.

The lower layer plating layer defined by Ni plating is used to prevent base electrode layer 32 from being eroded by solder when multilayer ceramic capacitor 10 is mounted, and the upper layer plating layer defined by Sn plating is used to improve wettability of solder when multilayer ceramic capacitor 10 is mounted so that the multilayer ceramic capacitor can be easily mounted.

The thickness per a single Ni plating layer is preferably, for example, greater than or equal to about 1.0 μm and less than or equal to about 15.0 μm.

The thickness per a single Sn plating layer is preferably, for example, greater than or equal to about 1.0 μm and less than or equal to about 15.0 μm.

The dimension in length direction z of multilayer ceramic capacitor 10 including multilayer body 12, first external electrode 30a, and second external electrode 30b is defined as an L dimension, the dimension in height direction x of multilayer ceramic capacitor 10 including multilayer body 12, first external electrode 30a, and second external electrode 30b is defined as a T dimension, and the dimension in width direction y of multilayer ceramic capacitor 10 including multilayer body 12, first external electrode 30a, and second external electrode 30b is defined as a W dimension.

The dimensions of multilayer ceramic capacitor 10 are, for example, as follows; the L dimension in length direction z is greater than or equal to about 1.6 mm and less than or equal to about 3.2 mm, the W dimension in width direction y is greater than or equal to about 0.8 mm and less than or equal to about 2.5 mm, and the T dimension in height direction x is greater than or equal to about 0.8 mm and less than or equal to about 2.5 mm. The dimensions of multilayer ceramic capacitor 10 can be measured, for example, using a microscope.

Multilayer ceramic capacitor 10 shown in FIG. 1 is configured such that on each of first main-surface-side outer layer portion 20a and second main-surface-side outer layer portion 20b, a protective structure 40 made of metal is disposed at a position not overlapping inner layer portion 18 when multilayer ceramic capacitor 10 is seen through from above.

With the above configuration, the mechanical strength can be improved as compared with the case where first main-surface-side outer layer portion 20a and second main-surface-side outer layer portion 20b having weak mechanical strength constitute the outer layer portion only with dielectric layer 14.

Further, in multilayer ceramic capacitor 10 shown in FIG. 1, protective structure 40 is not in contact with first end surface 12e and second end surface 12f. In other words, protective structure 40 is not exposed to first end surface 12e and second end surface 12f, and is disposed inside first main-surface-side outer layer portion 20a and second main-surface-side outer layer portion 20b.

With the above configuration, it is possible to reduce or prevent the occurrence of delamination between inner layer portion 18 and first main-surface-side outer layer portion 20a and between inner layer portion 18 and second main-surface-side outer layer portion 20b.

Further, as in multilayer ceramic capacitor 10 shown in FIG. 1, when protective structure 40 made of metal is disposed at a position not overlapping inner layer portion 18 in first main-surface-side outer layer portion 20a and second main-surface-side outer layer portion 20b when viewed from the upper surface of multilayer ceramic capacitor 10, the dielectric sheet is laminated on protective structure 40 at an end on a side of the side surface of multilayer body 12 in width direction y when the dielectric sheet is laminated, and the thickness at the end on the side of the side surface of multilayer body 12 in width direction y is increased by the thickness of protective structure 40. As a result, the thickness of multilayer body 12 in width direction y is equal or substantially equal to the thickness of the central portion of multilayer body 12. Therefore, in multilayer ceramic capacitor 10 shown in FIG. 1, the thickness of the central portion of multilayer body 12 in width direction y is not thicker than the thickness of the end on the side of the side surface of multilayer body 12 in the width direction, and does not have a barrel shape, but the thickness of the central portion of multilayer body 12 is equal or substantially equal to the thickness of the end on the side of the side surface of multilayer body 12 in width direction y, and the surfaces of first main surface 12a and second main surface 12b are flat. Therefore, since the adsorption area of the mounter at the time of mounting the substrate can be maximized, mountability of multilayer ceramic capacitor 10 at the time of mounting a substrate can be improved.

2. Method for Manufacturing Multilayer Ceramic Capacitor

Next, a non-limiting example of a method for manufacturing the multilayer ceramic capacitor according to a preferred embodiment of the present invention will be described.

First, a dielectric sheet for a dielectric layer and a conductive paste for an internal electrode layer are prepared. The conductive paste for the dielectric sheet and the internal electrode layer includes a binder and a solvent. Known binders and solvents can be used.

Then, a conductive paste for the internal electrode layer is printed on the dielectric sheet in a predetermined pattern by, for example, screen printing or gravure printing. Thus, the dielectric sheet on which a pattern of the first internal electrode layer is formed and the dielectric sheet on which a pattern of the second internal electrode layer is formed are prepared.

Regarding the dielectric sheet, a dielectric sheet for an outer layer on which a pattern of the internal electrode layer is not printed is also prepared.

Furthermore, regarding the dielectric sheet, a dielectric sheet for an outer layer on which a pattern of the protective structure is printed is also prepared.

Subsequently, a predetermined number of dielectric sheets for outer layers on which the pattern of the internal electrode layer is not printed are laminated, a predetermined number of dielectric sheets for outer layers on which the pattern of the protective structure is printed are laminated thereon, and then a predetermined number of dielectric sheets for outer layers on which the pattern of the internal electrode layer is not printed are further laminated thereon, and thus a portion to be the second main-surface-side outer layer portion on the side of the second main surface is formed. Then, the dielectric sheet on which the pattern of the first internal electrode layer is printed and the dielectric sheet on which the pattern of the second internal electrode layer is printed are sequentially laminated on the portion to be the second main-surface-side outer layer portion so as to provide the structure of the present preferred embodiment, thus forming the portion including the inner layer portion. Then, a predetermined number of dielectric sheets for outer layers on which the pattern of the internal electrode layer is not printed are laminated on the portion including the inner layer portion, a predetermined number of dielectric sheets for outer layers on which the pattern of the protective structure is printed are laminated thereon, and then a predetermined number of dielectric sheets for outer layers on which the pattern of the internal electrode layer is not printed are further laminated thereon, and thus a portion to be the first main-surface-side outer layer portion on the side of the first main surface is formed. Thus, a multilayer sheet is prepared.

Next, the multilayer sheet is pressed in the laminating direction by, for example, isostatic pressing to produce a multilayer block.

Then, the multilayer block is cut into a predetermined size to cut out multilayer chips. At this time, corners and ridges of a multilayer chip may be rounded by, for example, barrel polishing or the like.

Next, the multilayer chip is fired to prepare multilayer body. The firing temperature depends on the materials of the dielectric layer and the internal electrode layer, but is preferably, for example, greater than or equal to about 900° C. and less than or equal to about 1400° C.

Case of Baked Layer

Subsequently, a conductive paste to be a base electrode layer is applied to the first end surface and the second end surface of the multilayer body to form a base electrode layer. When a baked layer is formed as a base electrode layer, a conductive paste including a glass component and a metal is applied by, for example, a method such as dipping, and then a baking treatment is performed to form a base electrode layer. The temperature of the baking treatment at this time is preferably, for example, greater than or equal to about 700° C. and less than or equal to about 900° C.

Case of Conductive Resin Layer

When the conductive resin layer is provided in the external electrode, the conductive resin layer is formed as follows.

The conductive resin layer may be formed on the baked layer as a base electrode layer, or the conductive resin layer alone may be directly formed on the multilayer body without forming the baked layer.

As a method for forming the conductive resin layer, a conductive resin paste including a resin component and a metal component is prepared, and applied onto the base electrode layer using dipping. Thereafter, heat treatment is performed at a temperature, for example, greater than or equal to about 250° C. and less than or equal to about 550° C. to thermally cure the resin, and then a conductive electrode layer is formed.

The atmosphere during the heat treatment at this time is preferably, for example, a $N_2$ atmosphere.

In addition, in order to prevent scattering of the resin and to prevent oxidation of various metal components, it is preferable that the oxygen concentration is reduced to less than or equal to about 100 ppm.

Case of Thin Film Layer

When the base electrode layer is formed using a thin film layer, the base electrode layer can be formed by a thin film forming method such as, for example, sputtering or vapor deposition. The base electrode layer made of the thin film layer is a layer having a thickness, for example, less than or equal to about 1 μm on which metal particles are deposited.

Next, a plating layer is formed on the surface of the base electrode layer or the surface of the conductive resin layer as necessary. More specifically, in multilayer ceramic capacitor 10 shown in FIG. 1, a Ni plating layer is formed on the base electrode layer by the baked layer, and a Sn plating layer is formed on the Ni plating layer. The Ni plating layer and the Sn plating layer are sequentially formed by barrel plating, for example.

As described above, multilayer ceramic capacitor 10 according to the present preferred embodiment is manufactured.

3. Experimental Examples

According to the non-limiting example of a manufacturing method described above, multilayer ceramic capacitors were prepared as samples, and subjected to a substrate bending resistance test and a delamination evaluation test.

(a) Specification of Samples of Experimental Examples

As experimental examples, multilayer ceramic capacitors having the structure shown in FIGS. 1 to 4 and having the following specifications were prepared.

Dimensions of multilayer ceramic capacitor (design value): L×W×T=about 1.6 mm×about 0.8 mm×about 0.8 mm Material of main component of dielectric layer: $BaTiO_3$ Capacity: about 22 μF Rated voltage: about 16V Material of internal electrode layer: Ni Specifications of external electrode layer Specification of base electrode layer Base electrode layer: Baked layer including metal component and glass component Metal component: Cu Glass component: Si Thickness in length direction z at central part in height direction x of baked electrode layer located on first end surface and second end surface in cross section of multilayer body at about ½ W position: about 45 μm Specifications of plating layer Plating layer: Two-layer structure of Ni plating layer and Sn plating layer Thickness of Ni plating layer Thickness in length direction z at central portion in height direction x of Ni plating layer located on first end surface and second end surface in cross section of multilayer body at about ½ W position: about 4 μm Thickness of Sn plating layer Thickness in length direction z at central portion in height direction x of Sn plating layer located on first end surface and second end surface in cross section of multilayer body at about ½ W position: about 4 μm The sample of sample number 1 was a multilayer ceramic capacitor without a protective structure.

In the sample of sample number 2, dimension LP of the protective structure in length direction z was the same or substantially the same as dimension Lm of the multilayer body in length direction z, dimension WP of the protective structure in width direction y was the same or substantially the same as dimension Wgap, and dimension TP of the protective structure in height direction x was the same as dimension Tgap.

In the sample of sample number 3, with respect to the dimensions of the protective structure, dimension LP of the protective structure in length direction z was the same or substantially the same as dimension Lm of the multilayer body in length direction z, dimension WP of the protective structure in width direction y was the same or substantially the same as a dimension Wgap/2, and dimension TP of the protective structure in height direction x was the same or substantially the same as a dimension Tgap/2.

The sample of sample number 4 was a multilayer ceramic capacitor without a protective structure, the material of the dielectric layer defining the main-surface-side outer layer portion was $Ba_2TiSi_2O_8$, and the material of the dielectric layer defining the inner layer portion was $BaTiO_3$.

In the samples of sample numbers 5 to 10, a ratio (LP/Lm) of dimension LP in length direction z of the protective structure to dimension Lm in length direction z of the multilayer body was changed in a range of greater than or equal to about 24% and less than or equal to about 95%.

For the samples of sample numbers 11 to 14, a ratio (WP/Wgap) of dimension WP of the protective structure in width direction y to Wgap of the multilayer body was changed in the range of greater than or equal to about 49% and less than or equal to about 100%.

In the samples of sample numbers 15 to 18, a ratio (TP/Tgap) of dimension TP of the protective structure in height direction x to Tgap of the multilayer body was changed in the range of greater than or equal to about 60% and less than or equal to about 100%.

In sample No. 19, the ratio (LP/Lm) of dimension LP of the protective structure in length direction z to dimension Lm of the multilayer body in length direction z was set to about 76%, the ratio (WP/Wgap) of dimension WP of the protective structure in width direction y to the Wgap of the multilayer body was set to about 49%, and the ratio (TP/Tgap) of dimension TP of the protective structure in height direction x to the Tgap of the multilayer body was set to about 60%.

In sample No. 20, the ratio (LP/Lm) of dimension LP of the protective structure in length direction z to dimension Lm of the multilayer body in length direction z was set to about 84%, the ratio (WP/Wgap) of dimension WP of the protective structure in width direction y to the Wgap of the multilayer body was set to about 74%, and the ratio (TP/Tgap) of dimension TP of the protective structure in height direction x to the Tgap of the multilayer body was set to about 78%.

In the sample No. 21, the ratio (LP/Lm) of dimension LP of the protective structure in length direction z to dimension Lm of the multilayer body in length direction z was set to about 91%, the ratio (WP/Wgap) of dimension WP of the protective structure in width direction y to the Wgap of the multilayer body was set to about 90%, and the ratio (TP/Tgap) of dimension TP of the protective structure in height direction x to the Tgap of the multilayer body was set to about 95%.

(b) Substrate Bending Resistance Test

A multilayer ceramic capacitor as a sample was prepared, and a sample of the prepared multilayer ceramic capacitor was mounted on a JIS substrate (glass epoxy substrate) having a thickness of about 1.6 mm using a solder paste. Thereafter, the substrate was bent by pushing with a metal push rod having a round tip of about 5±0.1 mm from the substrate surface on which the sample was not mounted, and mechanical stress was applied to the substrate. At this time, the holding time was set to about 5 seconds, and the deflection amount was set to about 5 mm. Then, a cross-section of the multilayer ceramic capacitor as a sample after the substrate bending resistance test was polished to confirm the number of cracks generated in the exposed cross-section. 30 samples were prepared as each sample. The determination criteria were "Good" when the number of cracks generated was less than or equal to 10 in 30, "Fair" when the number of cracks generated was greater than or equal to 11 and less than or equal to 20 in 30, and "Poor" when the number of cracks generated was greater than or equal to 21 in 30.

(c) Delamination Evaluation Test

A multilayer ceramic capacitor as a sample was prepared, and the prepared sample of the multilayer ceramic capacitor was polished so as to expose a WT cross section bisected in length direction z, and the cross section was observed. Then, whether or not delamination occurred in the vicinity of the boundary between the multilayer body and the first and second main-surface-side outer layer portions was evaluated by observing the WT cross section. 50 samples were prepared as each sample. The determination criteria were "Good" when the number of samples in which delamination occurred was less than 10 in 50 samples, "Fair" when the number of samples was greater than or equal to 10 and less than or equal to 40 in 50 samples, and "Poor" when the number of samples was greater than or equal to 41 in 50 samples.

(d) Results

Table 1 shows results of the substrate bending resistance test and the delamination evaluation test for the samples of each sample number. The sample numbers marked with in the table do not fall within the scope of the present invention.

In the comprehensive determination by the above test shown in Table 1, when all the evaluation items of the substrate bending resistance test and the delamination evaluation test were determined to be "Good", it was determined to be "Good", when an evaluation determined to be "Fair" in any evaluation us included, it was determined to be "Fair", and when an evaluation determined to be "Poor" in any evaluation is included, it was determined to be "Poor".

TABLE 1

| Number of sample | Dimensions of multilayer body (mm) | | | Gap size (mm) | | | Dimensions of protective structure (mm) | | | Dimensions of protective structure to dimensions of multilayer body (%) | | | Configuration of main-surface-side outer layer portion | | Substrate bending resistance | | Number of occurring delamination (pieces) | Determination of delamination | Comprehensive determination |
|---|---|---|---|---|---|---|---|---|---|---|---|---|---|---|---|---|---|---|---|
| | Lm | Wm | Tm | Lgap | Wgap | Tgap | LP | WP | TP | LP/Lm | WP/Wgap | TP/Tgap | Presence/absence of protective structure | Dielectric material | (number of occurring cracks) (pieces) | Determination of substrate bending resistance | | | |
| *1 | 1.5 | 0.8 | 0.8 | 0.075 | 0.091 | 0.04 | 0 | 0 | 0 | 0 | 0 | 0 | Absent | Same as inner layer portion | 22/30 | Poor | 0/50 | Good | Poor |
| *2 | 1.5 | 0.8 | 0.8 | 0.075 | 0.091 | 0.04 | 1.50 | 0.09100 | 0.040 | 100 | 100 | 100 | Present | Same as inner layer portion | 4/30 | Good | 45/50 | Poor | Poor |
| *3 | 1.5 | 0.8 | 0.8 | 0.075 | 0.091 | 0.04 | 1.50 | 0.04550 | 0.020 | 100 | 50 | 50 | Present | Same as inner layer portion | 3/30 | Good | 43/50 | Poor | Poor |
| *4 | 1.5 | 0.8 | 0.8 | 0.075 | 0.091 | 0.04 | 0.00 | 0.00000 | 0.000 | 0 | 0 | 0 | Absent | Ba—Si—Ti—O-based crystal phase | 25/30 | Poor | 42/50 | Poor | Poor |
| 5 | 1.5 | 0.8 | 0.8 | 0.075 | 0.091 | 0.04 | 0.36 | 0.02275 | 0.012 | 24 | 25 | 30 | Present | Same as inner layer portion | 13/30 | Fair | 0/50 | Good | Fair |
| 6 | 1.5 | 0.8 | 0.8 | 0.075 | 0.091 | 0.04 | 0.77 | 0.02275 | 0.012 | 51 | 25 | 30 | Present | Same as inner layer portion | 12/30 | Fair | 0/50 | Good | Fair |
| 7 | 1.5 | 0.8 | 0.8 | 0.075 | 0.091 | 0.04 | 1.14 | 0.02275 | 0.012 | 76 | 25 | 30 | Present | Same as inner layer portion | 5/30 | Good | 0/50 | Good | Good |
| 8 | 1.5 | 0.8 | 0.8 | 0.075 | 0.091 | 0.04 | 1.26 | 0.02275 | 0.012 | 84 | 25 | 30 | Present | Same as inner layer portion | 4/30 | Good | 0/50 | Good | Good |
| 9 | 1.5 | 0.8 | 0.8 | 0.075 | 0.091 | 0.04 | 1.37 | 0.02275 | 0.012 | 91 | 25 | 30 | Present | Same as inner layer portion | 3/30 | Good | 0/50 | Good | Good |
| 10 | 1.5 | 0.8 | 0.8 | 0.075 | 0.091 | 0.04 | 1.43 | 0.02275 | 0.012 | 95 | 25 | 30 | Present | Same as inner layer portion | 4/30 | Good | 13/50 | Fair | Fair |
| 11 | 1.5 | 0.8 | 0.8 | 0.075 | 0.091 | 0.04 | 0.36 | 0.04459 | 0.012 | 24 | 49 | 30 | Present | Same as inner layer portion | 9/30 | Good | 0/30 | Good | Good |
| 12 | 1.5 | 0.8 | 0.8 | 0.075 | 0.091 | 0.04 | 0.36 | 0.06734 | 0.012 | 24 | 74 | 30 | Present | Same as inner layer portion | 8/30 | Good | 0/30 | Good | Good |
| 13 | 1.5 | 0.8 | 0.8 | 0.075 | 0.091 | 0.04 | 0.36 | 0.08190 | 0.012 | 24 | 90 | 30 | Present | Same as inner layer portion | 7/30 | Good | 0/30 | Good | Good |
| 14 | 1.5 | 0.8 | 0.8 | 0.075 | 0.091 | 0.04 | 0.36 | 0.09100 | 0.012 | 24 | 100 | 30 | Present | Same as inner layer portion | 6/30 | Good | 12/50 | Fair | Fair |
| 15 | 1.5 | 0.8 | 0.8 | 0.075 | 0.091 | 0.04 | 0.36 | 0.02275 | 0.024 | 24 | 25 | 60 | Present | Same as inner layer portion | 7/30 | Good | 0/30 | Good | Good |
| 16 | 1.5 | 0.8 | 0.8 | 0.075 | 0.091 | 0.04 | 0.36 | 0.02275 | 0.031 | 24 | 25 | 78 | Present | Same as inner layer portion | 5/30 | Good | 0/30 | Good | Good |
| 17 | 1.5 | 0.8 | 0.8 | 0.075 | 0.091 | 0.04 | 0.36 | 0.02275 | 0.038 | 24 | 25 | 95 | Present | Same as inner layer portion | 3/30 | Good | 0/30 | Good | Good |
| 18 | 1.5 | 0.8 | 0.8 | 0.075 | 0.091 | 0.04 | 0.36 | 0.02275 | 0.040 | 24 | 25 | 100 | Present | Same as inner layer portion | 3/30 | Good | 15/50 | Fair | Fair |

TABLE 1-continued

| Number of sample | Dimensions of multilayer body (mm) | | | | Gap size (mm) | | | Dimensions of protective structure (mm) | | | Dimensions of protective structure to dimensions of multilayer body (%) | | | | Configuration of main-surface-side outer layer portion | | Substrate bending resistance (number of occurring cracks) (pieces) | Determination of substrate bending resistance | Number of occurring delamination (pieces) | Determination of delamination | Comprehensive determination |
|---|---|---|---|---|---|---|---|---|---|---|---|---|---|---|---|---|---|---|---|---|---|
| | Lm | Wm | Tm | Lgap | Wgap | Tgap | LP | WP | TP | LP/Lm | WP/Wgap | TP/Tgap | Presence/absence of protective structure | Dielectric material | | | | | | |
| 19 | 1.5 | 0.8 | 0.8 | 0.075 | 0.091 | 0.04 | 1.14 | 0.04459 | 0.024 | 76 | 49 | 60 | Present | Same as inner layer portion | 0/30 | Good | 0/30 | Good | Good |
| 20 | 1.5 | 0.8 | 0.8 | 0.075 | 0.091 | 0.04 | 1.26 | 0.06734 | 0.031 | 84 | 74 | 78 | Present | Same as inner layer portion | 0/30 | Good | 0/30 | Good | Good |
| 21 | 1.5 | 0.8 | 0.8 | 0.075 | 0.091 | 0.04 | 1.37 | 0.08190 | 0.038 | 91 | 90 | 95 | Present | Same as inner layer portion | 0/30 | Good | 0/30 | Good | Good |

According to Table 1, as the sample of sample number 1 did not include the protective structure, the sample of sample number 1 was determined to be "Poor" as a result of the substrate bending resistance test due to insufficient mechanical strength.

The sample of sample number 2 included a protective structure, but regarding the dimensions of the protective structure, dimension LP of the protective structure in length direction z was the same as the dimension of the multilayer body in length direction z, dimension WP of the protective structure in width direction y was the same as the dimension of Wgap, and dimension TP of the protective structure in height direction x was the same as the dimension of Tgap. Therefore, the result of the substrate bending resistance test was "Good", but the result of the delamination evaluation test was determined to be "Poor".

In the sample of sample number 3, regarding the dimensions of the protective structure, dimension LP of the protective structure in length direction z was the same as dimension Lm of the multilayer body in length direction z, dimension WP of the protective structure in width direction y was the same as dimension Wgap/2, and dimension TP of the protective structure in height direction x was the same as dimension Tgap/2. Therefore, the result of the substrate bending resistance test was "Good", but the result of the delamination evaluation test was determined to be "Poor".

In the sample of sample number 4, the multilayer ceramic capacitor was a multilayer ceramic capacitor without a protective structure, the material of the dielectric layer defining the main-surface-side outer layer portion was $Ba_2TiSi_2O_8$, the material of the dielectric layer defining the inner layer portion was $BaTiO_3$, the material of the dielectric layer defining the main-surface-side outer layer portion was different from the material of the dielectric layer defining the inner layer portion, and therefore the result of the substrate bending resistance test was "Poor" due to the insufficient mechanical strength, and the result of the delamination evaluation test was also "Poor".

On the other hand, in the samples of sample numbers 5 to 10, a ratio (LP/Lm) of dimension LP in length direction z of the protective structure to dimension Lm in length direction z of the multilayer body was changed in a range of greater than or equal to about 24% and less than or equal to about 95%, and the protective structure was not in contact with both end surfaces. Therefore, the comprehensive determination for sample numbers 5 to 10 was "Good" or "Fair". In particular, for the samples of sample numbers 7 to 9, the ratio (LP/Lm) of dimension LP of the protective structure in length direction z to dimension Lm of the multilayer body in length direction z was greater than or equal to about 76% and less than or equal to about 91%, and thus the comprehensive determination was determined to be "Good".

In the samples of sample numbers 5 and 6, since the ratio (LP/Lm) of dimension LP of the protective structure in length direction z to dimension Lm of the multilayer body in length direction z was less than about 76%, it was determined as "Fair" in the substrate bending resistance test.

In the sample of sample number 10, since the ratio (LP/Lm) of dimension LP of the protective structure in length direction z to dimension Lm of the multilayer body in length direction z exceeded about 91%, it was determined as "Fair" in the delamination evaluation test.

In the samples of sample numbers 11 to 14, a ratio (WP/Wgap) of dimension WP of the protective structure in width direction y to Wgap of the multilayer body was changed in the range of greater than or equal to about 49% and less than or equal to about 100%, and the protective structure was not in contact with both end surfaces. Therefore, the comprehensive determination for sample numbers 11 to 14 was "Good" or "Fair". In particular, for the samples of sample numbers 11 to 13, the ratio (WP/Wgap) of dimension WP of the protective structure in width direction y to Wgap of the multilayer body was greater than or equal to about 49% and less than or equal to about 90%, and thus the comprehensive determination was determined to be "Good".

In the sample of sample number 14, since the ratio (WP/Wgap) of dimension WP of the protective structure in width direction y to Wgap of the multilayer body was about 100%, it was determined as "Fair" in the delamination evaluation test.

In the samples of sample numbers 15 to 18, a ratio (TP/Tgap) of dimension TP of the protective structure in height direction x to Tgap of the multilayer body was changed in the range of greater than or equal to about 60% and less than or equal to about 100%, and the protective structure was not in contact with both end surfaces. Therefore, the comprehensive determination for sample numbers 15 to 18 was "Good" or "Fair". In particular, in the samples of sample numbers 15 to 17, the ratio (TP/Tgap) of dimension TP of the protective structure in height direction x to Tgap of the multilayer body was greater than or equal to about 60% and less than or equal to about 95%, and thus the comprehensive determination was determined to be "Good".

In the sample of sample number 18, since the ratio (TP/Tgap) of dimension TP of the protective structure in height direction x to Tgap of the multilayer body was about 100%, it was determined as "Fair" in the delamination evaluation test.

In any of the samples of sample numbers 19 to 21, the ratio (LP/Lm) of dimension LP of the protective structure in length direction z to dimension Lm of the multilayer body in length direction z was in the range of about 76% or more and about 91% or less, the ratio (WP/Wgap) of dimension WP of the protective structure in width direction y to Wgap of the multilayer body was in the range of about 49% or more and about 90% or less, and the ratio (TP/Tgap) of dimension TP of the protective structure in height direction x to the Tgap of the multilayer body was in the range of about 60% or more and about 95% or less. Therefore, the comprehensive determination was determined to be "Good".

From the above results, in the samples of sample numbers 5 to 21, in the first main-surface-side outer layer portion and the second main-surface-side outer layer portion, a protective structure made of metal was disposed at a position not overlapping the inner layer portion when viewed from above the multilayer ceramic capacitor, and the protective structure was not in contact with the first end surface and the second end surface. Therefore, it has been confirmed that the first main-surface-side outer layer portion and the second main-surface-side outer layer portion having weak mechanical strength have improved mechanical strength as compared with the case where the outer layer portion is constituted only by the dielectric layer, and the occurrence of delamination between the inner layer portion and the first main-surface-side outer layer portion and between the inner layer portion and the second main-surface-side outer layer portion can be suppressed.

As described above, the present preferred embodiment of the present invention is disclosed in the above description, but the present invention is not limited thereto.

That is, various changes can be made in the mechanism, shape, material, quantity, position, arrangement, and the like with respect to the present preferred embodiment described above without departing from the scope of the technical idea and the object of the present invention, and these changes are included in the present invention.

Although the present invention has been described and illustrated in detail, it is clearly understood that the same is by way of illustration and example only and is not to be taken by way of limitation, the scope of the present invention being interpreted by the terms of the appended claims. The scope of the present invention is defined by the terms of the appended claims, and it is intended that meanings equivalent to the claims and all modifications within the scope are included.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
a multilayer body including a plurality of dielectric layers that are laminated, and including a first main surface and a second main surface facing each other in a height direction, a first side surface and a second side surface facing each other in a width direction orthogonal or substantially orthogonal to the height direction, and a first end surface and a second end surface facing each other in a length direction orthogonal or substantially orthogonal to the height direction and the width direction;
a first internal electrode layer on the plurality of dielectric layers and exposed to the first end surface;
a second internal electrode layer on the plurality of dielectric layers and exposed to the second end surface;
a first external electrode on the first end surface; and
a second external electrode on the second end surface; wherein
the multilayer body includes:
an inner layer portion in which the plurality of internal electrode layers face each other;
a first main-surface-side outer layer portion on a side of the first main surface, and including a plurality of the dielectric layers between the first main surface, and an outermost surface of the inner layer portion on the side of the first main surface and an extension plane of the outermost surface; and
a second main-surface-side outer layer portion on a side of the second main surface and including a plurality of the dielectric layers between the second main surface, and an outermost surface of the inner layer portion on the side of the second main surface and an extension plane of the outermost surface;
the first main-surface-side outer layer portion and the second main-surface-side outer layer portion each include a protective structure made of metal that is located only at a position not overlapping the inner layer portion when the multilayer ceramic capacitor is seen from above, and the protective structures are included only in the first main-surface-side outer layer portion and the second main-surface-side outer layer portion;
each of the protective structures extends continuously along the length direction and is not in contact with the first end surface and the second end surface; and
each of the protective structures includes a first end and a second end, the first end is located at a position overlapping the first external electrode and the second end is located at a position overlapping the second external electrode when the multilayer ceramic capacitor is seen from above.

2. The multilayer ceramic capacitor according to claim 1, wherein a dimension of at least one of the protective structures in the length direction is greater than or equal to about 76% and less than or equal to about 91% of a dimension of the multilayer body in the length direction.

3. The multilayer ceramic capacitor according to claim 1, wherein
the multilayer body further includes:
a first side-surface-side outer layer portion on a side of the first side surface, and including a plurality of the dielectric layers between the first side surface and the outermost surface of the inner layer portion on the side of the first side surface; and
a second side-surface-side outer layer portion on a side of the second side surface, and including a plurality of the dielectric layers located between the second side surface and the outermost surface of the inner layer portion on the side of the second side surface; and
a dimension of at least one of the protective structures in the width direction is greater than or equal to about 49% and less than or equal to about 90% of a dimension of the first and second side-surface-side outer layer portions in the width direction.

4. The multilayer ceramic capacitor according to claim 1, wherein a dimension of at least one of the protective structures in the height direction is greater than or equal to about 60% and less than or equal to about 95% of a dimension of the first and second main-surface-side outer layer portions in the height direction.

5. The multilayer ceramic capacitor according to claim 1, wherein at least one of the protective structures has a Young's modulus that is higher than a Young's modulus of the dielectric layers in the first and second main-surface-side outer layer portions.

6. The multilayer ceramic capacitor according to claim 1, wherein each of the protective structures is made of metal including at least one of Ni, Fe, Ti, Cu, Pt, Be, Pd, W, or Mo.

7. The multilayer ceramic capacitor according to claim 1, wherein a main component of a ceramic material of the plurality of dielectric layers of the first main-surface-side outer layer portion and the second main-surface-side outer layer portion is identical or substantially identical as a main component of a ceramic material of the plurality of dielectric layers of the inner layer portion.

8. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

9. The multilayer ceramic capacitor according to claim 8, wherein each of the plurality of dielectric layers includes at least one of Mn compound, an Fe compound, a Cr compound, a Co compound, or a Ni compound as a subcomponent.

10. The multilayer ceramic capacitor according to claim 1, wherein a thickness of each of the plurality of dielectric layers is greater than or equal to about 0.5 μm and less than or equal to about 10.0 μm.

11. The multilayer ceramic capacitor according to claim 1, wherein
a dimension of the multilayer body in the length direction is greater than or equal to about 1.5 mm and less than or equal to about 3.0 mm;

a dimension of the multilayer body in the width direction is greater than or equal to about 0.8 mm and less than or equal to about 2.4 mm; and a dimension of the multilayer body in the height direction is greater than or equal to about 0.8 mm and less than or equal to about 2.4 mm.

12. The multilayer ceramic capacitor according to claim 1, wherein at least one of the protective structures is located at a position of greater than or equal to about 9% and less than or equal to about 24% on an inner side from the first end surface and the second end surface, with respect to a dimension of the multilayer body in the length direction.

13. The multilayer ceramic capacitor according to claim 1, wherein each of the first and second internal electrode layers includes at least one of Ni, Cu, Ag, Pd, or Au, or an alloy including at least one of Ni, Cu, Ag, Pd, or Au.

14. The multilayer ceramic capacitor according to claim 1, wherein a thickness of each of the first and second internal electrode layers is greater than or equal to about 0.2 µm and less than or equal to about 2.0 µm.

15. The multilayer ceramic capacitor according to claim 1, wherein each of the first and second external electrodes includes:

a base electrode layer; and a plating layer on the base electrode layer.

16. The multilayer ceramic capacitor according to claim 15, wherein the base electrode layer includes a baked layer including a metal component and a glass component.

17. The multilayer ceramic capacitor according to claim 16, wherein the glass component includes at least one of B, Si, Ba, Sr, Ca, Mg, Al, Ti, Zr, K, Na, or Li.

18. The multilayer ceramic capacitor according to claim 1, wherein the protective structures include a plurality of metal bodies extending in the length direction along a length of the inner layer portion.

19. The multilayer ceramic capacitor according to claim 18, wherein each of the plurality of metal bodies is adjacent to a ridge portion of the inner layer portion.

* * * * *